US007142990B2

(12) United States Patent
Bouse et al.

(10) Patent No.: US 7,142,990 B2
(45) Date of Patent: Nov. 28, 2006

(54) MACHINE FAULT INFORMATION DETECTION AND REPORTING

(75) Inventors: Kai Bouse, Tellico Plains, TN (US); Todd Reeves, Knoxville, TN (US)

(73) Assignee: CSI Technology, Inc., Wilmington, DE (US)

( * ) Notice: Subject to any disclaimer, the term of this patent is extended or adjusted under 35 U.S.C. 154(b) by 94 days.

(21) Appl. No.: 10/419,444

(22) Filed: Apr. 21, 2003

(65) Prior Publication Data

US 2004/0019461 A1 Jan. 29, 2004

Related U.S. Application Data

(63) Continuation-in-part of application No. 10/127,868, filed on Apr. 22, 2002, now Pat. No. 6,839,660.

(51) Int. Cl.
*G06F 11/00* (2006.01)

(52) U.S. Cl. ............................. 702/35; 702/189; 700/2

(58) Field of Classification Search ............ 702/31–35, 702/189, 188; 700/2, 9, 19
See application file for complete search history.

(56) References Cited

U.S. PATENT DOCUMENTS

| 4,443,861 | A | * | 4/1984 | Slater ............................ 710/8 |
| 4,520,674 | A | | 6/1985 | Canada et al. |
| 4,965,880 | A | * | 10/1990 | Petitjean ...................... 700/112 |
| 5,146,401 | A | * | 9/1992 | Bansal et al. .................. 700/9 |
| 5,253,184 | A | * | 10/1993 | Kleinschnitz ................ 702/184 |
| 5,262,732 | A | | 11/1993 | Dickert et al. |
| 5,263,261 | A | | 11/1993 | Piety et al. |
| 5,323,328 | A | * | 6/1994 | Tanaka ........................ 700/287 |
| 5,386,117 | A | | 1/1995 | Piety et al. |
| 5,386,117 | A | | 1/1995 | Piety et al. |
| 5,394,739 | A | | 3/1995 | Garvey, III et al. |
| 5,426,774 | A | * | 6/1995 | Banerjee et al. ............... 714/16 |
| 5,506,501 | A | | 4/1996 | Fogel et al. |
| 5,526,282 | A | | 6/1996 | Nower et al. |
| 5,530,343 | A | | 6/1996 | Bowers, III et al. |
| 5,544,073 | A | | 8/1996 | Piety et al. |
| 5,566,092 | A | * | 10/1996 | Wang et al. .................. 702/185 |
| 5,583,797 | A | * | 12/1996 | Fluegge et al. ............. 700/279 |
| 5,604,441 | A | | 2/1997 | Freese et al. |
| 5,614,830 | A | | 3/1997 | Dickert et al. |
| 5,621,655 | A | | 4/1997 | Nower et al. |
| 5,633,811 | A | | 5/1997 | Canada et al. |
| 5,637,871 | A | | 6/1997 | Piety et al. |
| 5,646,350 | A | | 7/1997 | Robinson et al. |
| 5,656,767 | A | | 8/1997 | Garvey, III et al. |

(Continued)

FOREIGN PATENT DOCUMENTS

AU 2634192 A1 6/1993

(Continued)

*Primary Examiner*—Marc S. Hoff
*Assistant Examiner*—Mary Catherine Baran
(74) *Attorney, Agent, or Firm*—Luedeka, Neely & Graham

(57) ABSTRACT

Sensors detect machine parameters such as vibration, turning speed, and temperature, and a local processor performs logic operations based on the parameters and inference rules to produce fault information that is reported to a system processor, which selectively uses the fault information to control the plant machines. The inference rules include rules for determining faults as to balance, alignment, bearing condition, electrical condition, and cavitation. The inference rules are contained in rules code that is separate from the analysis code that performs the logical operations. Thus, the inference rules may be easily changed without changing other code, such as the analysis code.

18 Claims, 5 Drawing Sheets

U.S. PATENT DOCUMENTS

| | | | |
|---|---|---|---|
| 5,674,401 A | 10/1997 | Dickert et al. | |
| 5,680,025 A | 10/1997 | Bowers, III et al. | |
| 5,684,578 A | 11/1997 | Nower et al. | |
| 5,687,391 A * | 11/1997 | Judd et al. | 710/15 |
| 5,691,924 A | 11/1997 | Czyzewski et al. | |
| 5,715,609 A | 2/1998 | Nower | |
| 5,726,911 A | 3/1998 | Canada et al. | |
| 5,739,698 A | 4/1998 | Bowers et al. | |
| 5,744,723 A | 4/1998 | Piety | |
| 5,817,928 A | 10/1998 | Garvey, III et al. | |
| 5,841,255 A | 11/1998 | Canada et al. | |
| 5,852,351 A | 12/1998 | Canada et al. | |
| 5,854,994 A | 12/1998 | Canada et al. | |
| 5,864,773 A * | 1/1999 | Barna et al. | 702/85 |
| 5,870,699 A | 2/1999 | Canada et al. | |
| 5,875,420 A | 2/1999 | Piety et al. | |
| 5,895,857 A | 4/1999 | Robinson et al. | |
| 5,907,491 A | 5/1999 | Canada et al. | |
| 5,922,963 A | 7/1999 | Piety et al. | |
| 5,943,634 A | 8/1999 | Piety et al. | |
| 5,952,803 A | 9/1999 | Canada et al. | |
| 5,960,214 A | 9/1999 | Sharpe, Jr. et al. | |
| 5,965,819 A | 10/1999 | Piety et al. | |
| 5,980,094 A | 11/1999 | Nower | |
| 6,002,996 A * | 12/1999 | Burks et al. | 702/188 |
| 6,017,143 A | 1/2000 | Eryurek et al. | |
| 6,024,521 A | 2/2000 | Swaggerty | |
| 6,041,287 A | 3/2000 | Dister et al. | |
| 6,064,480 A | 5/2000 | Mountain et al. | |
| D427,097 S | 6/2000 | Garvey, III et al. | |
| 6,078,874 A | 6/2000 | Piety et al. | |
| 6,084,195 A | 7/2000 | Swaggerty et al. | |
| 6,087,796 A | 7/2000 | Canada et al. | |
| 6,088,689 A * | 7/2000 | Kohn et al. | 706/10 |
| 6,091,236 A | 7/2000 | Piety et al. | |
| 6,124,692 A | 9/2000 | Canada et al. | |
| 6,138,078 A | 10/2000 | Canada et al. | |
| 6,189,384 B1 | 2/2001 | Piety et al. | |
| 6,192,325 B1 | 2/2001 | Piety et al. | |
| 6,199,018 B1 | 3/2001 | Quist et al. | |
| 6,216,539 B1 | 4/2001 | Johnson et al. | |
| 6,220,098 B1 | 4/2001 | Johnson et al. | |
| 6,234,021 B1 | 5/2001 | Piety et al. | |
| 6,247,353 B1 | 6/2001 | Battenberg et al. | |
| 6,297,742 B1 | 10/2001 | Canada et al. | |
| 6,301,514 B1 | 10/2001 | Canada et al. | |
| 6,330,525 B1 | 12/2001 | Hays et al. | |
| 6,368,068 B1 | 4/2002 | Corlew et al. | |
| 6,370,448 B1 | 4/2002 | Eryurek | |
| 6,594,620 B1 * | 7/2003 | Qin et al. | 702/185 |
| 6,618,630 B1 * | 9/2003 | Jundt et al. | 700/17 |
| 6,633,782 B1 * | 10/2003 | Schleiss et al. | 700/26 |
| 2003/0040878 A1 * | 2/2003 | Rasmussen et al. | 702/85 |

FOREIGN PATENT DOCUMENTS

| | | |
|---|---|---|
| CA | 2081228 | 11/1991 |
| GB | 547015 | 8/1942 |
| GB | 2 323 665 A | 9/1998 |
| GB | 2 324 877 A | 11/1998 |
| GB | 2 337 117 A | 11/1999 |
| GB | 2 339 284 A | 1/2000 |

* cited by examiner

MACHINE FAULT INFORMATION DETECTION AND REPORTING

CROSS REFERENCE TO RELATED APPLICATIONS

This application is a continuation-in-part of co-pending U.S. application Ser. No. 10/127,868, entitled ON-LINE ROTATING EQUIPMENT MONITORING DEVICE, filed on Apr. 22, 2002 now U.S. Pat. No. 6,839,660.

FIELD OF THE TECHNOLOGY

The present invention relates generally to process plant monitoring devices and, more particularly, to a device that performs on-line monitoring for rotating equipment within a process plant.

DESCRIPTION OF THE RELATED ART

Process control systems, like those used in chemical, petroleum or other processes, typically include one or more centralized or decentralized process controllers communicatively coupled to at least one host or operator workstation and to one or more process control and instrumentation devices, such as field devices, via analog, digital or combined analog/digital buses. Field devices, which may be, for example valves, valve positioners, switches, transmitters, and sensors (e.g., temperature, pressure and flow rate sensors), perform functions within the process such as opening or closing valves and measuring process parameters. The process controller receives signals indicative of process measurements or process variables made by or associated with the field devices and/or other information pertaining to the field devices via the communication busses, uses this information to implement a control routine and then generates control signals which are sent over the one or more of the buses to the field devices to control the operation of the process. Information from the field devices and the controller is typically made available to one or more applications executed by an operator workstation to enable an operator to perform desired functions with respect to the process, such as viewing the current state of the process, modifying the operation of the process, etc.

Many process plants, and especially those that use smart field devices (which are field devices having on-board microprocessors), include applications used to help monitor and maintain many of the devices within the plant. For example, the Asset Management Solutions (AMS) application sold by Fisher-Rosemount Systems, Inc. enables communication with and stores data pertaining to field devices to ascertain and track the operating state of the field devices. This activity is typically called condition monitoring. An example of such a system is disclosed in U.S. Pat. NO. 5,960,214 entitled "Integrated Communication Network for use in a Field Device Management System." In some instances, the AMS application may be used to communicate with devices to change parameters within the device, to cause the device to run applications on itself, such as self calibration routines or self diagnostic routines, to obtain information about the status or health of the device, etc. This information may be stored and used by a maintenance person to monitor and maintain these devices. This product is especially capable when it can connect to and acquire data from the smart field devices via a fixed communication network, such as one associated with the HART or FOUNDATION Fieldbus protocol. However, local or portable handheld interface devices may be used, in many cases, to acquire or collect data pertaining to field devices or other devices within the plant and this data may then be uploaded to the maintenance software for processing or viewing.

While a typical process control system has many process control and instrumentation devices, such as valves, transmitters, sensors, etc., connected to one or more process controllers and maintenance computers, there are many other supporting devices which are related to and necessary for the process operation. These additional devices include, for example, power supply equipment, power generation and distribution equipment, and other rotating equipment such as turbines, pumps, etc., located at numerous places in a typical process plant. While this additional equipment does not necessarily create or use process variables and, in most instances, is not controlled or even coupled to a process controller for the purpose of affecting the process operation, this equipment is nevertheless important to and ultimately necessary for proper operation of the process. However, because monitoring of this equipment is not typically needed for process control, this equipment, if monitored at all, is generally monitored very infrequently, such as on a monthly basis, and only for maintenance purposes.

In particular, while a plant will sometimes be set up to perform regular condition monitoring on the most critical rotating equipment, such as turbines, compressors and critical pumps, most of the rotating equipment within the plant (called "balance of plant" equipment) is not monitored on an on-going basis. When permanent condition monitoring is performed on equipment, the condition monitoring system typically includes a set of sensors mounted on the equipment, with the sensors being configured to provide data to a local buffer device. This buffer device stores the data and, periodically, downloads the data to an off-line computer system that then processes the data to detect current or future problems, error conditions, etc. using a variety of different diagnostic applications. The off-line computer system is typically associated with or provided by a specialized service provider who may collect the data from the buffer device using, for example, a hand-held (e.g., a local) communication device or a fixed communication link, such as the internet. Once collected, the data is processed using typically proprietary software and a report is generated and sent to the plant maintenance personnel indicating actual or potential problems with the equipment.

Other less important mechanical equipment is typically monitored on a less frequent basis, such as once a month. In these cases, a service provider comes to the plant, temporarily attaches appropriate measurement devices, such as temperature, pressure, speed and vibration sensors, to the rotating equipment, collects data from the sensors during operation of the equipment and then takes the data back to the service site to run diagnostics on that data. Thereafter, a diagnostic report is generated and sent to the plant personnel electronically and/or in paper format.

Unfortunately, in both of these instances, there may be a significant time lag between the times at which the rotating equipment data is collected and, additionally, there may be a further time lag between the time when the data is collected and when a diagnostic report is received at the plant. As a result, there are significant periods of times during which problems with the rotating equipment may go undetected, enabling a problem to get out of hand, cause serious damage to the equipment or cause poor performance in the plant. Also, because the data collection is periodic, intermittent problems may go unnoticed simply because the problem is not occurring at the time the data is being collected. Moreover, this data collection procedure is labor intensive and can be very expensive, in spite of the fact that, with the higher demands on production and needs for optimization, monitoring and controlling this rotating equipment have become a higher priority in today's advanced platforms.

SUMMARY

A rotating equipment monitoring device includes a set of sensors, such as temperature, speed, pressure, and vibration sensors, locally connected to a diagnostic unit having a plant communication interface and a processor that implements one or more diagnostic routines. The diagnostic unit collects data from the sensors and performs diagnostics thereon to detect actual or potential problems with the device on a continuous or semi-continuous basis. Using the communication interface, the diagnostic unit automatically sends signals indicating problems or other messages about the rotating equipment to a maintenance system or a control system via standard or common communication network, such as a HART or Fieldbus network. The diagnostic unit may also be intermittently coupled to an off-line computer, such a one associated with a service provider who may verify or further define the diagnostics provided by the diagnostic unit.

This rotating equipment monitoring device provides the advantage of operating on-line, in a dedicated manner to collect and process data for a particular piece of rotating equipment within the plant and to provide immediate indications of the current or future operating state of that equipment to plant personnel via plant communication infrastructure. Because the monitoring device is connected to and capable of performing diagnostics for the piece of rotating equipment at any time, the monitoring device is capable of detecting intermittent problems and of quickly recognizing a problem that may need immediate attention or that may be responsible for poor plant performance. Because the monitoring device may be connected to and communicate via common communication protocols, such as the HART or Fieldbus protocol, the monitoring device is easy to install and maintain.

In accordance with one embodiment of the present invention, the diagnostic unit includes a plurality of local processors that receive the parameter signals. Each local processor is associated with a subset of machines and a corresponding subset of processors, and each local processor receives the parameter signals from the subset of sensors with which it is associated. Inference rules are programmed into the local processors to perform all logical operations based on the parameter signals and the plurality of inference rules to determine fault information for each machine. The fault information is transmitted from local processors to a system processor through a communication network. The system processor is programmed to selectively issue control commands based on the fault information. A control system is responsive to the control commands to selectively modify the operation of the machines based on the fault information. The system processor may modify the operation of a machine for which fault information was generated, or it may modify the operation of a second machine based on the fault information related to a first machine.

In accordance with a particularly advantageous embodiment, the inference rules include rules for determining five critical types of machine faults, namely, faults as to machine balance, alignment between machines, bearings, electrical conditions, and cavitation. Preferably, each local processor is programmed with an analysis code for performing the logical operations and a rules code containing the inference rules. The rules code is separate from and not embedded in the analysis code. Using this structure, the rules code is adapted for reconfiguration to change in the inference rules without changing the analysis code. Most preferably, the local processor is programmed with analysis code, rules interface code and rules code. Again, the rules code provides inference rules for use in the analysis code when performing the logical operations. The rules interface code provides a protocol for transferring information from the rules code to the analysis code. Thus, the rules code may be changed to provide a new rules code so long as the new rules code conforms to the protocol established by the rules interface code. Again, the rules code may be changed without changing either the analysis code or the rules interface code.

In accordance with another aspect of the present invention, the different rules contained in the rules code are customized for a particular machine that is being monitored by the system. Likewise, the rules code may be customized for a number of related machines.

DETAILED DESCRIPTION

Figure 1:
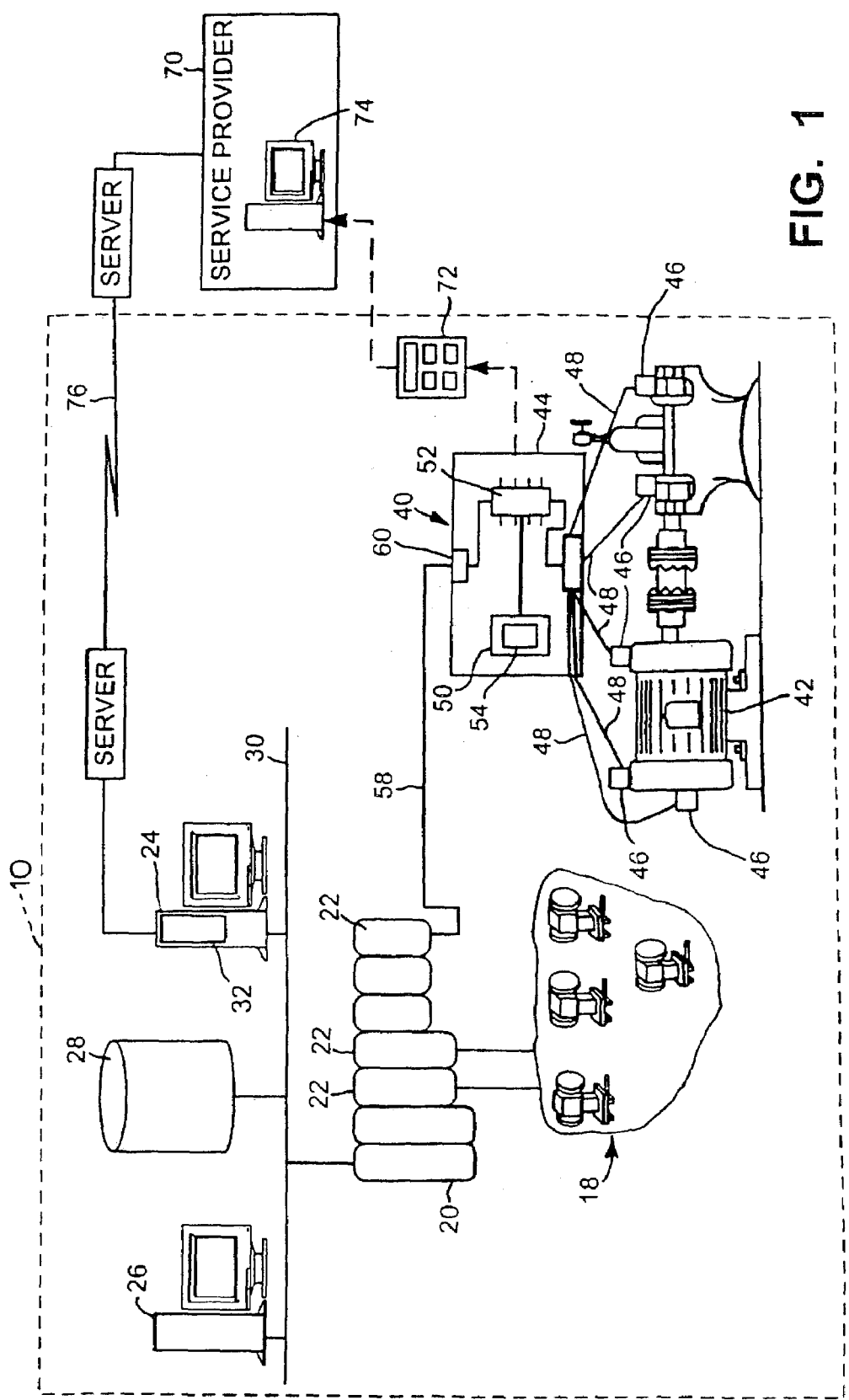
FIG. 1 is a schematic block diagram of a rotating equipment monitoring device which is coupled to a turbine and which is in communication with a process plant and a service provider site.

Referring now to FIG. 1, a process plant 10 includes numerous field devices 18 connected to a distributed control system (DCS) controller 20 via one or more input/output devices 22. The DCS controller 20 is connected to one or more host computers 24 and 26 and to a data historian 28 via a bus 30 which may be, for example, an Ethernet bus. As is known, the DCS controller 20 performs any desired type of control within the plant 10 by sending signals to and receiving signals from the field devices 18 and processing such signals using any known or standard control software. The DCS controller 20 may report status information to one or more applications within, for example, the host computer 24 regarding the operating state of the process and/or the operating state of the field devices 18. If desired, one of the applications 32 within the host computer 24 may be a maintenance application, such as the AMS application described above, which tracks the operating state of different devices within the process plant 10. Of course, other applications (depicted generally by the application 32) within the host computers 24 and 26 may include optimization applications, control applications, performance monitoring applications, display applications such as error or alarm applications that display indications of device conditions to plant personnel, etc. Of course, these applications may display any desired information to an operator or to a maintenance person within the plant 10 via display devices associated with the host computers 24 or 26. The control system illustrated in FIG. 1 is merely exemplary in nature and other types or configurations of control systems can be used as well.

As illustrated in FIG. 1, a rotating equipment monitoring device 40 is mounted on or near a piece of rotating equipment 42 within the plant 10. While illustrated as being mounted on a turbine, the rotating equipment monitoring device 40 may be mounted on or near other types of rotating equipment, such as pumps, fans, gear boxes, motors, compressors, etc. The rotating equipment monitoring device 40 includes a diagnostic unit 44 connected to numerous sensors 46 via, for example, communication lines 48. If desired, however, the diagnostic unit 44 may be connected to communicate with the senors 46 in a wireless manner using standard wireless transmitters and receivers. The sensors 46 may be any desired types of sensors typically or advantageously used to perform condition monitoring on rotating equipment, such as vibration sensors or transducers (including, for example, accelerometers, velocity sensors, and proximity or displacement sensors), pressure sensors, temperature sensors (like thermocouples or resistive temperature detector (RTD) devices), speed sensors, flux sensors, current sensors, etc. Of course, other types of sensors may be used as well, such as laser detectors, etc. While not necessary, it is generally desirable to have at least one speed sensor, at least one temperature sensor and multiple vibration sensors permanently mounted at appropriate locations on or near the rotating equipment 42 to be able to perform diagnostics on the rotating equipment 42. In any event, the specific types and numbers of sensors used within the rotating equipment monitoring device 40 and the placement of those sensors on the rotating equipment 42 will vary depending on the type of rotating equipment being monitored and on the level or types of diagnostics being performed.

The diagnostic unit 44 includes a memory 50 and a processor 52, which may be a microprocessor or microcontroller, an ASIC or other processing device that is configured or programmed to collect the data generated by the sensors 46 and to perform diagnostics on that data to detect current or future (expected) conditions within the rotating equipment 42 based on the collected data. The detected conditions may include, for example, misalignment of the rotating equipment, low oil, rise in temperature, too many motor starts or stops, clogged vents, etc. Of course, these are only some of the possible conditions that can be detected and other conditions may be detected in any known or desired manner. The diagnostic unit 44 may store and implement any desired diagnostic routine(s) 54 in the memory 50 to detect the conditions, with these routines differing generally based on the type of rotating equipment being monitored and the level or accuracy of diagnostics desired. In general, the more sensors 46 that are coupled to the diagnostic unit 44, the better the diagnostic unit 44 will be able to detect conditions and the more conditions that will be detectable. Furthermore, the diagnostic unit 44 may be able to store and implement different diagnostic routines of different capability depending on the use to which the monitoring device 40 is put.

In any event, the diagnostic unit 44, which is preferably permanently mounted near to or on the rotating equipment 42, is connected to the DCS controller 20 via a plant communication network 58 and an input/output device 22 associated with the DCS controller 20. The plant communication network 58 may be, for example, a 2-wire communication network like a 4–20 milliamp network, a HART network, a FOUNDATION Fieldbus network or any other desired type of communication network. This network could instead be a 3-wire or a 4-wire network if so desired. While the communication network 58 is illustrated in FIG. 1 as a hardwired network, it could also be a wireless network using any appropriate type of wireless communication devices.

To communicate via the network 58, the diagnostic unit 44 includes any known or desired communication interface 60, which may be, for example, a software interface (executed on the microprocessor 52), a combined software and hardware interface or a firmware interface, appropriate for the communication network 58, with the communication interface 60 being capable of sending signals or messages via the network 58 to the DCS 20 as illustrated in FIG. 1. If desired, however, the diagnostic unit 44 could be connected to other computers within the plant 10, such as the host computers 24 and 26, via the same or other plant based communication networks.

During operation of the plant 10, the sensors 46 (which are preferably permanently mounted on the rotating equipment 42) send signals to the diagnostic unit 44 which then processes the received signals in any desired manner to produce indications of one or more conditions associated with the rotating equipment 42. The diagnostic unit 44 may store the received data as well as processed data or the condition indications in the memory 50. During operation, the processor 52 may execute the diagnostic routine(s) 54 using the collected data to detect actual or potential (e.g., expected) conditions associated with the rotating equipment 42. These conditions may include actual or expected problems as well as other conditions, such as conditions that indicate the health, status, amount of use and variability of the rotating equipment 42. As noted above, the detected conditions may include, for example, misalignment of the rotating equipment, low oil, rise in temperature, number of motor starts or stops, hours of use, number of rotations, clogged vents, etc. Generally, the type of conditions can be different, as would be appropriate, for different types of rotating equipment and would be different depending on the nature of the diagnostic routine(s) 54 being used. As an example, however, the diagnostic or condition monitoring routines 54 implemented by the processor 52 may implement some or all of the procedures described in U.S. Pat. Nos. 5,263,261; 5,526,282; 5,684,578; 5,980,094; 5,854, 994; 5,907,491; 5,530,343; 5,680,025; 5,726,911; 5,739, 698; 6,087,796; 5,262,732; 6,234,021; 5,646,350; 5,691, 924; 5,744,723; 5,875,420; 5,895,857; 5,922,963; 5,943, 634; 6,370,448; and 6,017,143 which are hereby expressly incorporated by reference herein. If necessary, the diagnostic routine(s) 54 may send requests for (or be configured to automatically receive) information from the DCS controller 20, one or more of the host computers 24 or 26, the data historian 28, or other devices within the plant 10 such as one or more of the field devices 18, and may use this data as well to perform diagnostics on the rotating equipment 42.

In any event, after performing any desired level of diagnostics, the diagnostic unit 44 may send an indication of a detected condition to the DCS controller 20 or to one or more of the host computers 24 and 26 to alert plant personnel of the problem or condition. In this manner, the diagnostic unit 44 can monitor the condition of the rotating equipment 42 and, upon detecting a problem, error, alert or other condition, can immediately notify a plant operator or maintenance personnel, the controller software or other applications, such as optimization applications, of the detected condition. This operation eliminates the lag in time that it typically takes to alert plant operators or maintenance personnel or other applications within the plant of negative conditions within the rotating equipment. Of course, the recipients of the data can use that data in any desired manner, such as to alter the use of the plant equipment relying on the rotating equipment 42, to perform or schedule maintenance for the rotating equipment 42, to order parts for the rotating equipment 42, to change the control routine to optimize plant performance in the presence of the condition, etc.

Still further, if desired, the raw data collected by the sensors 46, the indications of the detected conditions determined by the diagnostics unit 44 or any other data within the diagnostics unit 44 may be sent to a service provider site 70 using any desired technique. For example, that data may be periodically downloaded to a handheld (local) interface device 72 (which can be connected to the diagnostic unit 44 via a local communication interface within the interface 60 using any desired type of interface protocol) and delivered to the site 70 for processing. Alternatively or in addition, this data may be periodically transmitted via, for example, an internet or other public communication network connected to the service provide site 70. When the data has been delivered to the service provider site 70, a service provider may process this data on, for example, a service provider computer 74 to verify the diagnostics performed by the diagnostic unit 44. Alternatively or in addition, the computer 74 may perform other or more complete diagnostics to further identify a detected condition and to suggest a solution or a root cause of the problem. Of course, the computer 74 may use any known or desired software or processing routines to perform diagnostics on the collected data. After performing diagnostics, the service provider computer 74 may send a verification or other information regarding the detected condition to one of the host computers 24 within the plant 10 via, for example, an internet communication link 76. Of course, the service provider computer 74 may communicate with the plant 10 in any other desired or typical manner, such as via a written report.

In any event, the service provider at the service provider site 70 can periodically verify or expand upon the conditions detected by the diagnostic unit 44 to provide the plant personnel more information or more confidence with respect to the condition of the rotating equipment 42 as detected by the monitoring device 40. While, as before, the service provider, will typically be able to perform its analysis only periodically, the diagnostic unit 44 is capable of providing an on-line, immediate and constantly updated indication of the general condition of the rotating equipment 42 and can be used to provide to the plant personnel at least a rough indication of operating conditions of the rotating equipment 42 that might lead to an eventual machine defect. This indication can increase machine life by not allowing root causes to run uncorrected (such as pump cavitation under certain process loads). The diagnostic unit 44 is also able to detect intermittent "bump in the night" problems and serious problems that may occur very quickly, such as detecting the sudden loss of lubrication due to a burst seal or water contamination washing out the lubrication. Of course, this detection may be inferred from various sensor data if it cannot be measured directly. The diagnostic unit 44 is also able to indicate that the rotating equipment 42 needs to be maintained based on actual measurements, instead of using a time-between maintenance analysis. For example, the diagnostic unit 44 may provide an indication that the rotating equipment 42 needs to be lubricated based on actually measured or estimated (based on various sensor data) lubrication conditions instead of using a time-based schedule. Further, the diagnostic unit 44, because it is operating on-line, may detect clogged motor vents (based on temperature rise, for example), may detect axial misalignment (using a laser sensor, for example, or based on the processing of other sensor data), may document the actual number of motor starts and generate an alarm on too many starts as well as a host of other activities. Of course, the diagnostic unit 44 may perform any other condition monitoring or diagnostics using data from the sensors 46.

While there are many different types of rotating equipment, most rotating equipment has a set of common features which can be exploited to enable the same monitoring device 40 to be able to be used on different types of rotating equipment. In particular, it is desirable to produce the rotating equipment monitoring device 40 using a generally applicable platform that can be programmed differently depending on the use and level and types of diagnostics desired. Thus, it is generally beneficial to use a programmable processor within the diagnostic unit 44 which can be programmed with different diagnostic software depending on the type of rotating equipment for which the monitoring device 40 is to be put. Further, it is generally desirable to provide the monitoring device 40 with a certain minimum number of channels and of allowing the diagnostic unit 44 to be scalable in the number of sensors it supports. These features will make the monitoring device 40 more applicable to different types of rotating equipment. For example, pumps, fans, compressors, etc. may all require a monitoring device with approximately four or six vibration channels (sensors). Other groups of equipment that have similar monitoring requirements and provide the ability to monitor minimally or optimally according to customer preference and budget constraints.

The diagnostic routine(s) 54 may provide an indication of the health, use or variability of the equipment and may send signals regarding those conditions to the operator, maintenance person, DCS controller, optimizer routine, or other routines. If desired, the diagnostic unit 44 may be configured to provide power to the sensors 46 in any manner, and may be configured to obtain power from the 2-wire, 3-wire or 4-wire network or other common digital communication network to which it is connected. Preferably, although not necessarily, the monitoring device 40 is field installable, may provide a health index of the device being monitored and can be integrated with a DCS controller using any desired protocol, such as the 4–20 mA, HART™ and FOUNDATION Fieldbus™ protocols (or any other Fieldbus protocol such as the Profibus and CAN protocols), a TCP/IP protocol, etc. As a result, the information within the diagnostics unit 44 is preferably accessible and viewable using a browser from the host computer 24 in the same manner as field devices, such as Fieldbus field devices are browsable. This browser may include, for example, the Internet Explorer, Netscape, etc. browsers or browsers associated with host applications, such as the browsers within the AMS application which provides an embedded HTML server core. The diagnostic unit 44 is also preferably able to be integrated with asset management systems, such as RBMware (sold by CSI Technology, Inc.), the AMS system described above, any desired or appropriate CMMS packages. Also, the monitoring device 40 may have a scalable or variable number of sensors (such that the diagnostic unit 44 is configured to receive and has ports for up to any desired number of sensors) and so can be upgraded over time wherein, typically, the higher the number of sensors, the more capability the monitoring device 40 includes. Of course, the software or diagnostic routines 54 within the device 40 may be changed or upgraded as well. Still further, the sensors 46 may be removably connected to the diagnostic unit 44 using any desired or appropriate coupling technology.

Figure 2:
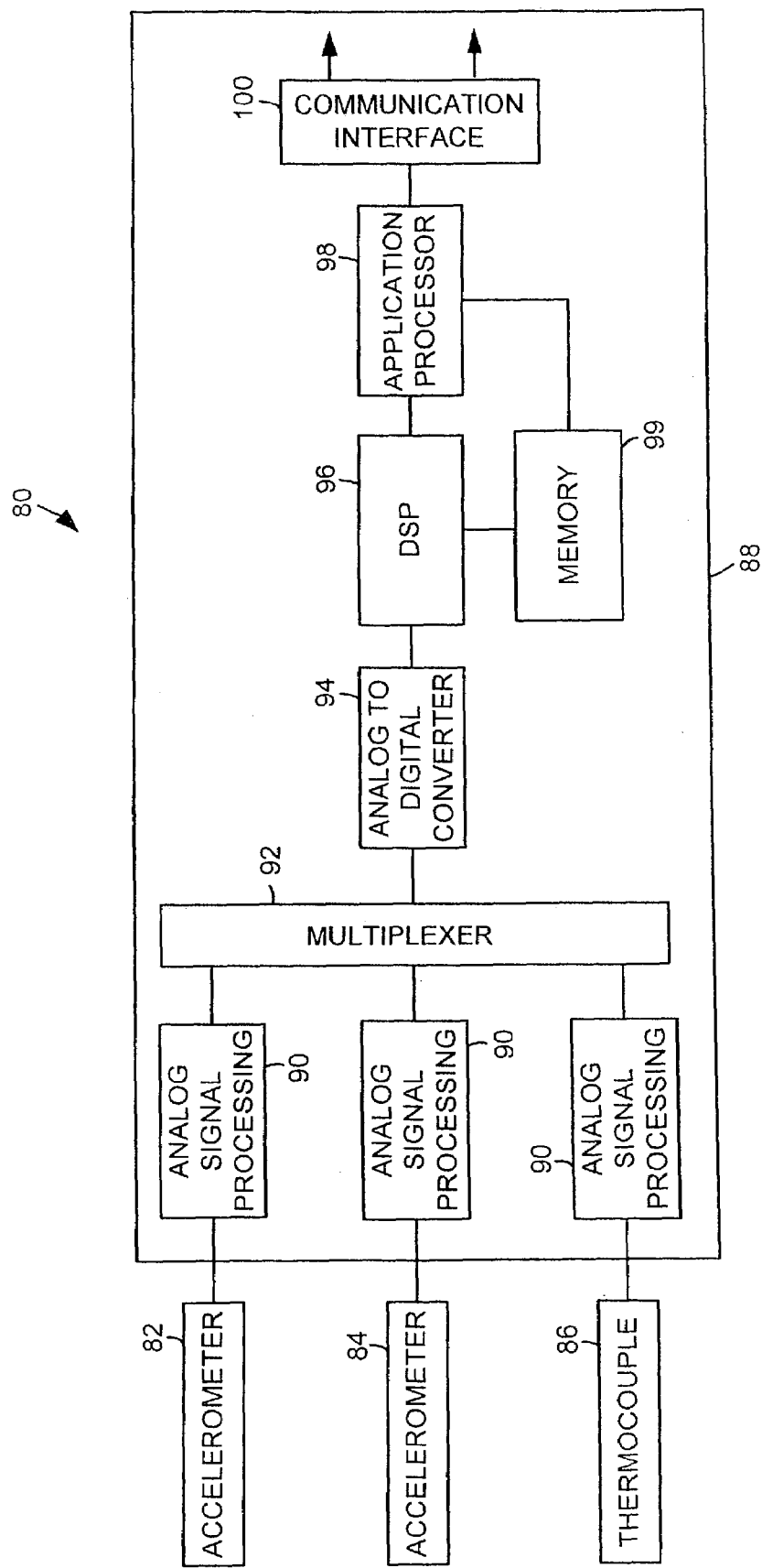
FIG. 2 is a block diagram of a rotating equipment monitoring device, such as the one of FIG. 1, having three channels.

Referring now to FIG. 2, a block diagram of a three channel rotating equipment monitoring device 80 is illustrated as including three analog sensors, namely two accelerometers 82 and 84 and a thermocouple 86, communicatively coupled to a diagnostic unit 88. Of course other types of sensors, such as digital sensors, and additional sensors may be used as well. The diagnostic unit 88 includes analog signal processing circuitry 90 which processes the signals from each of the sensors to, for example, filter and decode the analog signals. A multiplexer 92 then provides the processed analog signals, one at a time, to an analog-to-digital converter 94 which provides a digital signal to a digital signal processor 96. The digital signal processor 96 performs digital signal processing, such as filtering, Fourier transforming, etc. on the digital signals and provides the digital signals and/or the processed signals to an application processor 98 and, if desired, to a memory 99 for storage. The application processor 98 may perform diagnostic routines such as the diagnostic routines 54 discussed above with respect to FIG. 1. Of course, the application processor 98 may implement any desired processing using the signals received from the digital signal processor 98 or stored in the memory 99, and any other signals, such as signals received from a controller or host device (not shown in FIG. 2). In any event, the application processor 98 detects conditions or problems based on the received and stored signals and produces indications of these conditions, for example, in the form of signals or messages to be sent to the plant personnel or other applications within the plant 10.

The application processor 98 provides the signals to a communication interface 100 which may be any desired or type of interface. The interface 100 packages or reformats the signals and sends them to a DCS controller, a host computer, a historian database, etc. via a communication network, such as a HART or Fieldbus communication network (which may be, for example, the FOUNDATION Fieldbus protocol network, the Profibus protocol network, the CAN protocol network, etc.), a TCP/IP network or any other desired communication network. Of course, the interface 100 may be configured in the same manner as the communication interfaces of field devices 18 or other devices in the plant 10 so that the monitoring device 80 appears to the plant 10 as the other devices, which can be accessed, communicated with, detected, browsed, etc.

If desired, the monitoring devices 40 and 80 may configured to perform according to any desired level of processing functionality. For example, the processing frequency and number of channels (sensors) for the monitoring device should be the highest needed by equipment in the class of devices that the monitoring device 40 or 80 will be used to monitor. The monitoring device 40 or 80 may be configured to provide, for example, a 0–70 Hz processing frequency with 5 channels; a 0–70 Hz processing frequency with 10 channels; a 0–150 Hz processing frequency with 5 channels and; a 0–150 Hz processing frequency with 10 channels, etc. Of course, other ranges and sensor numbers may be used as well. Still further, if desired, each monitoring device 40 or 80 may include one speed input for order-based analysis and order tracking, one digital input for use in scheduling, one digital output for alarm enunciation (possibly two in the 10-channel configuration), one analog input for an additional variable; e.g., temperature or load (possibly both) and one analog output (4–20 ma) for a 0–100% health condition indication. Of course, other channels and inputs and outputs could be provided as well, such as channels used for flux monitoring.

Also preferably, the diagnostic unit 44 or 88 will support 100, 200, 400, 800, 1600, 3200 or 6400 line collections at a set of bandwidths predefined to meet the needs of the type of rotating equipment to be monitored. This could be in the range of 100 orders maximum with easily computed intervals (e.g., 8.75 Hz, 70 Hz, 875 Hz, 7 KHz; 18.75 Hz, 150 Hz, 1.875 KHz, 15 KHz). Tachometer pulse marking of the waveform, order-tracking and synchronous averaging may all be supported by the diagnostic unit 44 or 88. It is not necessary to provide dynamic auto-ranging during acquisition of sensor signals. Rather, if desired, the diagnostic unit 44 or 88 may implement a method for periodically performing an auto-range function and then using the results until further notice. The monitoring device 40 or 80 may also store and schedule self-test and calibration functions on a regular basis as defined by a personality module that may be integrated therein.

Still further, the monitoring device 40 or 80 may provide support for peak analysis processing. The monitoring device 40 or 80 may include, for example, an analog peak following circuit that can be switched into the signal path to allow use of the default acquisition frequencies. Still further, a set of selectable bandpass and highpass filters (such as two each) tailored to the default acquisition ranges for the type of rotating equipment to be monitored may be used to provide further processing. During this analysis, the monitoring device 40 or 80 may collect and determine typical scalar values, such as RMS, peak, peak-to-peak and DC bias on the vibration channels or the other analog input channels. The monitoring device 40 or 80 may determine the state of the digital input(s) and may determine the current speed as measured on the tachometer channel.

Of course, the monitoring device 40 or 80 may determine other values using any traditional parameter, waveform or spectra analysis and using any set of appropriate equations. In this regard, the diagnostic unit 44 or 88 may use spectral analysis, statistical analysis, wavelet analysis, fractal analysis, artificial intelligence, expert engines, such as simple if-then rule base expert systems, fuzzy logic systems, neural network systems, etc., or any other type of analysis to determine conditions of the rotating equipment 42. Likewise, the monitoring device 40 or 80 may have its own decision making capabilities based on the information it gathers on a particular rotating equipment. Typically, the more information that is available, the more diagnostic capabilities the diagnostic unit 44 or 88 will have.

While the rotating equipment monitoring devices 40 and 80 have been described herein for use with a turbine, they could also be used to perform condition monitoring for any other types of rotating equipment, such as machine tools, cutters, rollers, robots, conveyors, miners, cranes, etc. that have a movement and/or vibration aspect which can be analyzed to determine a health or other condition of the rotating equipment. Also, the diagnostic unit 44 or 88 is preferably configured to operate substantially continuously during operation of the rotating equipment to detect conditions associated with the rotating equipment, that is to operate continuously or on a periodic time frame with a small interval, e.g., once every minute or couple of minutes. Also the diagnostic unit 44 or 88 may be configured to send the condition indications automatically upon generating them, automatically in a periodic manner or when polled by another computer, such as one of the host computers 24 and 26.

While the rotating equipment monitoring devices 40 and 80 have been described as preferably performing processing and diagnostics using software, they may use hardware, firmware, etc. using any type of processor, such as an ASIC, etc. In any event, the recitation of a routine stored in a memory and executed on a processor includes hardware and firmware devices as well as software devices. For example, the elements described herein may be implemented in a standard multi-purpose CPU or on specifically designed hardware or firmware such as an application-specific integrated circuit (ASIC) or other hard-wired devices as desired and still be a routine executed in a processor. When implemented in software, the software routine may be stored in any computer readable memory such as on a magnetic disk, a laser disk, an optical disk, or other storage medium, in a RAM or ROM of a computer or processor, in any database, etc. Likewise, this software may be delivered to a user or a process plant via any known or desired delivery method including, for example, on a computer readable disk or other transportable computer storage mechanism or over a communication channel such as a telephone line, the internet, etc. (which are viewed as being the same as or interchangeable with providing such software via a transportable storage medium).

Critical Faults

In devising a plant monitoring and control system, there is a tension between complete and being concise. In our context, "complete" means monitoring every possible parameter and potential problem. "Concise" means monitoring only that which is necessary. In attempting to be complete, expense is increased and a cost benefit analysis may suggest that the "completeness" is not required. Also, it is possible to be so complete that important problems are masked by a flurry of inconsequential problems or information. It is also difficult to be concise because deciding what is necessary to monitor and control means that certain parameters and problems will be de-emphasized.

In a preferred embodiment which is suitable for most applications, it is critical to monitor for faults, as opposed to any conceivable condition. Most preferably and more specifically in this embodiment, it is critical to monitor for at least the following faults: a balance fault, misalignment, a bearing fault, an electrical fault and cavitation. Inference rules are identified or chosen to test for the critical faults, and the inference rules define the parameters that are monitored. Then the inference rules are applied to the monitored parameters to determine fault information which corresponds to the critical faults.

Figure 3:
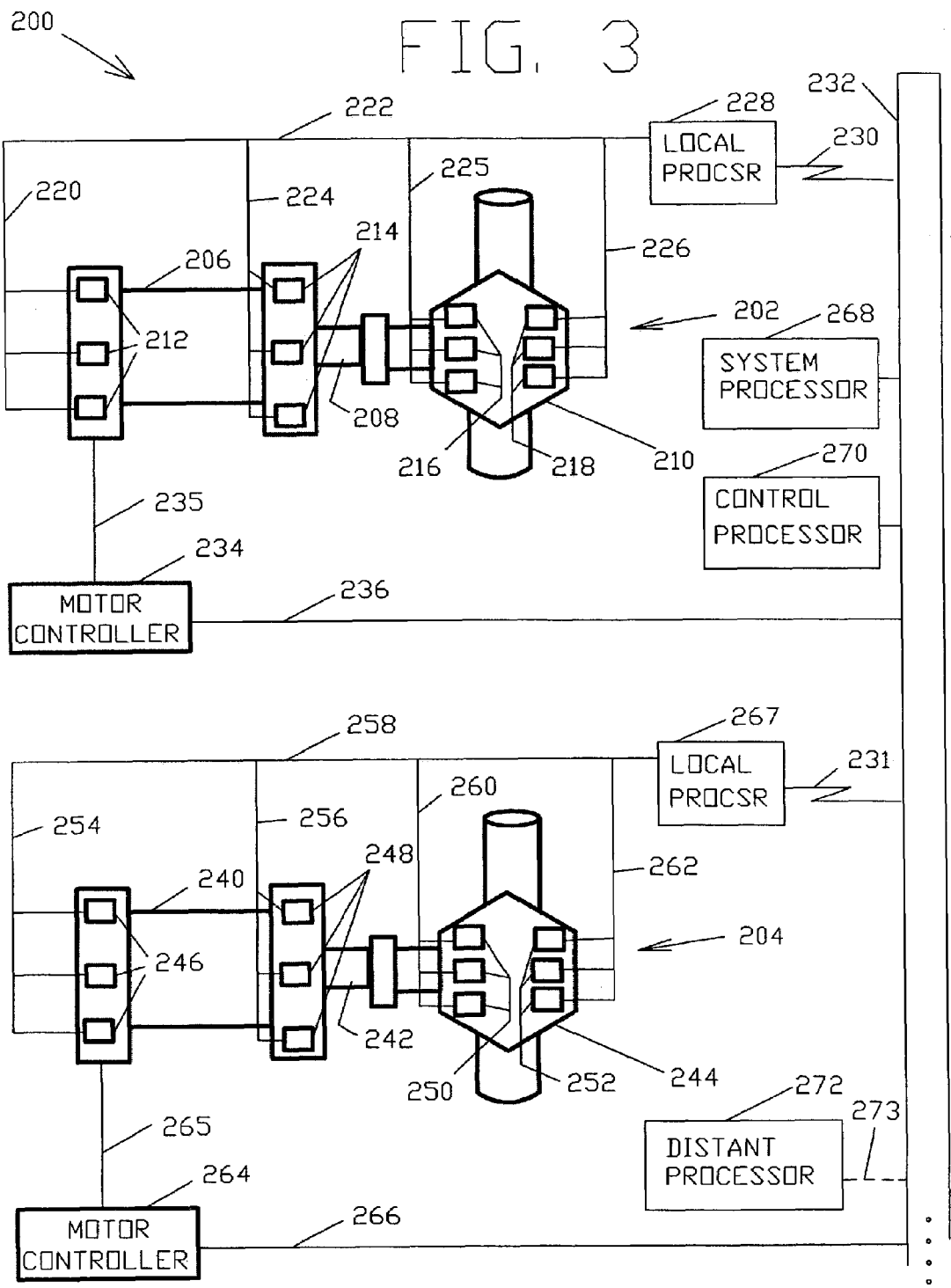
FIG. 3 is a schematic circuit diagram of an embodiment showing two pump and motor sets monitored by local processors that transmit fault information to a system processor that controls the machines.
Figure 4:
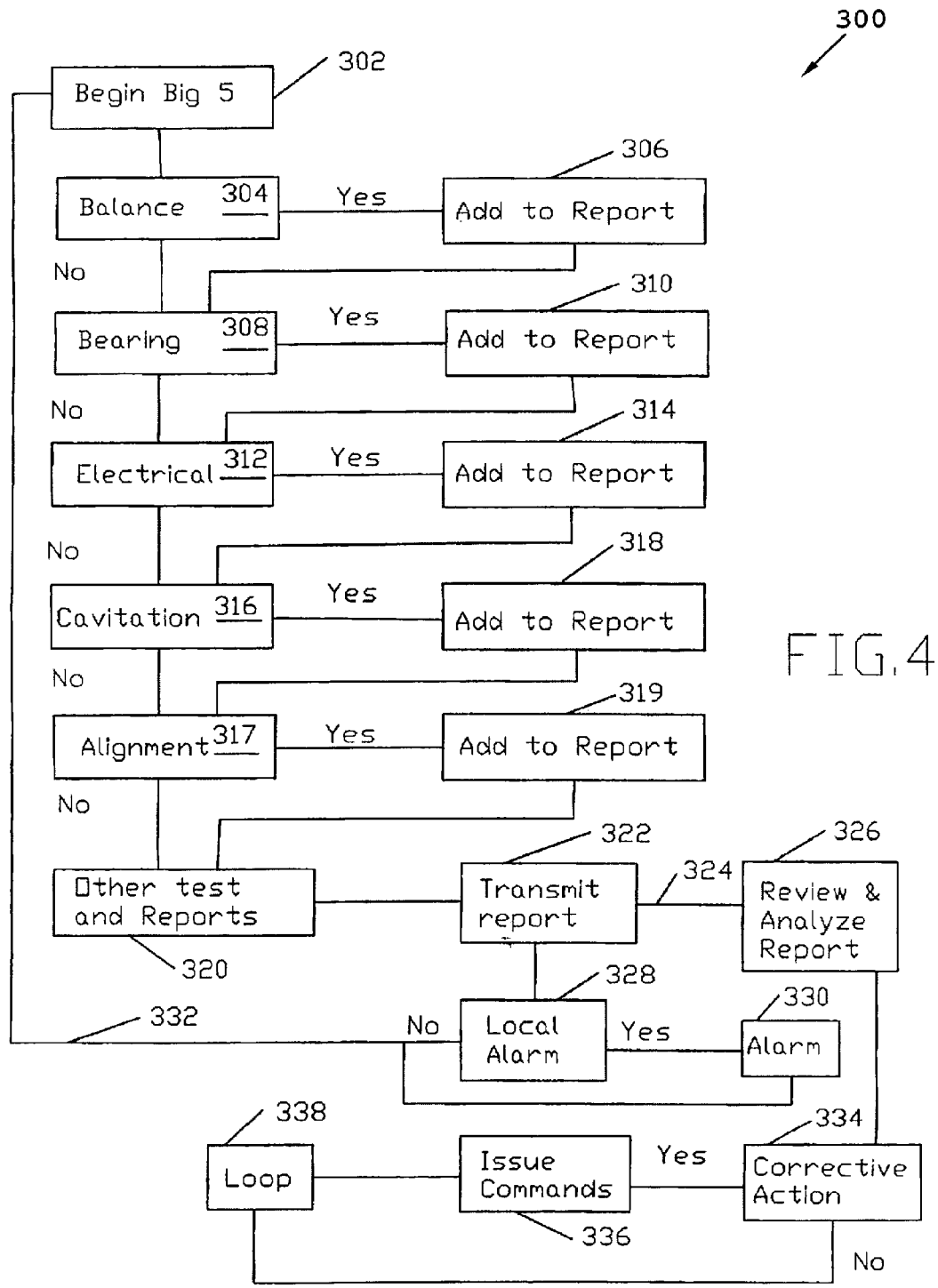
FIG. 4 is a flow chart illustrating one software routine for monitoring machines, reporting fault information and controlling machines.

Referring to FIG. 2, an embodiment of the invention is disclosed in which two motor and pump sets are specifically illustrated, but it will be understood that numerous other machines are present in the system 200 of FIG. 3. The motor and pump set 202 includes a motor 206 connected by a shaft and coupling assembly 208 to a pump 210. Three outboard sensors 212 and three inboard sensors 214 are mounted on the motor 206. In both the outboard and inboard positions, the sensors 212 and 214 preferably measure the horizontal, vertical and axial vibration, respectively.

Likewise, three inboard sensors 216 and three outboard sensors 218 are mounted on the pump 210 for preferably measuring horizontal, vertical and axial vibration at both the outboard and the inboard positions. The sensors 212, 214, 216 and 218 are connected by lines 220, 222, 224, 225 and 226 to a local processor 228, and the processor 228 is connected by lines 230 to a system bus 232. A motor controller 234 is connected by lines 235 to monitor and control the operation of the motor 206. The motor controller 234 is connected by lines 236 to the system bus 232 and by lines 222 to the local processor 228.

The motor and pump set 204 is identical to the pump set 202 in every respect. It includes a motor 240 and a pump 244 with inboard motor sensors 248 and outboard motor sensors 246. Inboard pump sensors 250 and outboard pump sensors 252 are provided along with a motor controller 264. The sensors 246, 248, 250 and 252 are interconnected with the local processor by lines 254, 256, 260 and 262, and the motor controller is connected to the local processor 267 by lines 258 and to the system bus 232 by lines 266. The system bus 232 is also connected to a system processor 268 which is in turn connected to a control processor 270. Both the system processor 268 and the control processor 270 are connected by telephone line, intranet, internet or a similar communication device to a distant computer 272 which may be connected to receive information from a number of different plants around the country or world. The connection to the distant computer 272 is represented by dashed lines 273. The bus 232, system processor 268, control processor 270, and controller 234 and 264 are preferably part of a control system/process automation system such as a Delta V or Ovation produced by Emerson Process Management Company.

While six sensors are shown on each machine in FIG. 3, it should be understood that these sensors schematically represent a plurality of sensors that may number more or less than six and represents different types of sensors such as temperature, flux, voltage, amperage, light or other sensors.

Operation

In operation, the system processor 268 issues commands to a control processor 270 to cause the motors 206 and 240 to operate at a desired speed and therefore the pumps 210 and 244 will pump at a desired rate. The control processor 270 may issue commands directly through lines 236 and 266 to the motor controllers 234 and 264 to command the operation of the motors 206 and 258. The motor controllers also receive feedback from the motor which is relayed through lines 236 and 266 back to the control processor 270 and the system processor 268 through the bus 232. In this manner, the control processor under instructions from the system processor operates the motors 234 and 264 as desired. Alternatively, the commands to the motor controllers 234 and 264 can be transmitted through and relayed by the local processors 228 and 226, or the local processors 288 and 267 may be issued commands causing them to independently monitor the motor controllers 234 and 264 and independently control the future operation of the motors 206 and 240 until additional instructions are provided by either the system processor or the control processor. Even though the system processor 268 and the control processor 270 have been described above as if they were separate pieces of hardware, it will be understood that these two processors could instead be a single processor that performs both the system function and the control function.

Signals representing parameters such as flux, vibration and temperature are transmitted by the aforementioned sensors back to the local processors 228 and 267. Within those local processors, the signals are analyzed according to the analysis code and the fault rules programmed into the local processors, and a logic operation is thereby accomplished which produces fault information. Referring to FIG.

4, a flow chart 300 is provided to illustrate one procedure that is executed by the local processors 228 and 267 in conjunction with the system processor 268. The flowchart 300 illustrates a procedure designed to detect, report and correct five critical faults that may be associated with the system 200 illustrated in FIG. 3. The initiation of the procedure is indicated at block 302 labeled "Begin Big 5". The routine first moves to block 304 and executes balance tests to determine whether the machines have a balance fault, such as out of balance. To determine whether the motor, pump, or both are out of balance, typically, a number of tests will be performed. For purposes of brevity, only one test is described herein. To make a decision as to balance or imbalance, the following balance test (logic operation) is performed:

The psuedocode for the test is:
IF *1XRPM RADIAL RATIO IS UNKNOWN
   AND *MEASUREMENT ORIENTATION IS RADIAL
   AND EXCESS VIBRATION AT 1XRPM IS YES
      PROBLEM IS IMBALANCE (060): 0

This psuedocode means that:
(1) if the one times turning speed ratio of vibration in the horizontal compared to the vertical measurements is unknown, and
(2) the measurement directions are in the radial direction, and
(3) the vibrations are excessive (above a threshhold) at a frequency of one times turning speed, then a balance fault is detected.

If the test results indicate that a balance fault has been detected, the program moves to the block 306 and adds balance fault information to a report. The balance fault information indicates the presence of a balance fault and indicates the degree or magnitude of the balance fault (eg. the amount of vibration) and the identity of the machine or machines that have a balance fault.

The definition of a "balance fault" flows from the inference rules that are chosen and may vary depending on the machine and their environment. One type of "balance fault" may be a high level of vibration that is caused by an out of balance condition. However, a balance fault may also include a condition in which the machine appears to be too well balanced. For example, a machine designed to shake violently could have a balance fault if little imbalance is detected.

Another example, consider a situation where the shaft and coupling assembly 208 completely fails. The motor 206 would have no load and it may be operating too smoothly. Likewise, since the pump 210 is not moving, it may appear to be perfectly balanced. To detect this type of fault, the inference rules may be set to identify perfect balance or very good balance as a balance fault.

If no balance fault is detected, the program moves to block 308. Likewise, after the report is generated at block 306, the program will move to block 308. At this point, bearing tests will be executed to determine whether there is a bearing fault. Again, typically, a plurality of tests are performed to make this determination but only one is provided here as an example. To test for a bearing fault, the following logic operation is performed:
   Rolling Element Bearings:
   The psuedocode for the rule is:
IF *BEARING DESIGN IS ROLLING ELEMENT
   AND *BPFO PEAKS IS NO
   AND *BPFI PEAKS IS NO
   AND *FTF PEAKS IS NO
   OR *FTF PEAKS IS UNKNOWN
   AND *BSF PEAKS IS NO
   AND *BEARING DEFECT PATTERNS IS YES
   OR *1X SDB NONSYN PEAKS>10XRPM IS YES
   AND HI FREQ BEARING PATTERN IS YES
      PROBLEM IS BEARING FAULT (100): 0
      PROBLEM IS BEARING FAILURE PLUS(100): 0

The psuedocode means that:
(1) If the bearing design is a rolling element bearing, and
(2) there are no ball pass frequency outer race frequencies present, and
(3) there are no ball pass frequency inner race frequencies present, and
(4) there are no fundamental train frequency frequencies present or the fundamental train frequencies are unknown, and
(5) the Ball spin frequency peaks are not present, and
(6) bearing defect patterns do exist or there are one times turning speed frequency sidebands on either side of the non-synchronous frequencies that are greater than 10 times turning speed, and
(7) there are high frequency bearing frequency patterns are present, then there is a bearing fault and additionally bearing failure.

If the bearing test indicates the presence of a fault, the program moves to block 310 and bearing fault information (including the identity of the bearing (s) and the severity of the fault) are added to the report. If no bearing fault is determined, the program moves to block 312 and, likewise, if a bearing fault is determined, the program moves to block 312 after adding the bearing fault information to the report. At block 312, electrical tests are performed to determine the presence or absence, and severity of a electrical fault. Again, typically, multiple tests (logic operations) of this type are performed but for purposes for illustration, one example of an electrical test is provided below:

Electrical:

The psuedocode is:
IF *MACHINE IS MOTOR OR *MACHINE IS GENERATOR
   AND *COMPONENT ORIENTATION IS HORIZONTAL
   AND *MEASUREMENT ORIENTATION IS AXIAL
   AND HIGH AXIAL AMP AT 2X LINE IS YES
   THEN PROBLEM IS OFF MAGNETIC CENTER (070): 0

This psuedocode means:
(1) If the machine is a motor or the machine is a generator, and
(2) the machine is mounted in the horizontal direction, and
(3) the vibration measurement is collected in the axial direction, and
(4) high vibration (exceeding a threshhold) is present in the axial direction at two times the electrical line frequency, then an electrical fault is present, namely the is rotor running off magnetic center.

If no electrical fault is detected, the program will move to block 316. If an electrical fault is found, the program moves to block 314 and electrical fault information, including the type and severity of the fault are added to the report and, after the report is created, the program moves from block 314 to block 316 where cavitation tests are performed. While numerous cavitation tests (logic operations) are typically performed, one example is provided below:

Cavitation:
The psuedocode is:
IF *MACHINE IS PUMP
  AND *ACTUAL FLOW-BEP RATIO'>'0.0
  AND EXCESS VANE PASS AMPLITUDE IS YES
    PROBLEM IS PUMP CAVITATION (060): 0

This psuedocode means:
(1) If the machine is a pump, and
(2) the pump is operating above it's best efficiency point, and
(3) there is flow through the pump, and
(4) the vane pass frequency amplitude is excessive (above a threshhold) then a cavitation fault exists.

If the cavitation tests indicate the absence of cavitation, the program moves to block 317. If cavitation is present, then after block 318, the program will then move to block 317. At this point, alignment tests are performed to determine the presence of and severity of any alignment fault that may exist. On example of an alignment test (logic operation) is as follows:

Misalignment:
The psuedocode is:
IF *COMPONENT ORIENTATION IS HORIZONTAL
  AND *INLINE FLEXIBLE COUPLING IS YES
  AND *MEASUREMENT ORIENTATION IS RADIAL
  AND EXCESS VIBRATION AT 1XRPM IS YES
  AND EXCESS VIBRATION AT 2XRPM IS YES
  AND 3X<PEAK<10OX IS NO
  AND 1XRPM RADIAL RATIO'>'0.25
  AND 1XRPM RADIAL RATIO '<'4.0
    PROBLEM IS SHAFT MISALIGNMENT (080): 0

This psuedocode means:
(1) If the components in the machine train are mounted or oriented in the horizontal direction, and
(2) the machine train contains an in-line flexible coupling, and
(3) the measurements collected on the machine train were in the radial direction, and
(4) excessive vibration above a threshhold appears at a frequency of one times turning speed frequency, and
(5) excessive vibration (above a threshhold) occurs at a frequency of two times the turning speed frequency, and
(6) there are no excessive vibration frequencies between three times turning speed and ten times turning speed, and
(7) the ratio of horizontal to radial measurements is greater than 0.25 and less than 4.0) then an alignment fault is present. In this case it is misalignment.

If no alignment fault is detected, the program moves to block 320. If an alignment fault is detected, the program moves to 319 and adds alignment fault information to the report in a manner similar to that described above. Then, the program moves to block 320.

At block 320, other optional tests and reports are generated, and then the program then moves to 322 at which point it transmits the report as indicated by dotted line 324 to the system processor 268 (FIG. 3). As indicated at block 326, the report is received and analyzed by the processor 268. As discussed above, many uses exist for the information provided by the local processors 228 and 267, but for purposes of this embodiment, the most important action is to analyze the fault information for the need for corrective action as indicated at block 334. The rules governing the corrective action will vary depending on a particular application. There can be rules that require immediate automatic corrective action, rules that require immediate alarms and rules that suggest human corrective action, and rules that generate various levels of warnings. In this case, since pumps are involved, automatic corrective action will be taken in the case of certain types of cavitation. In this particular example, the system 200 will represent pump and motor sets 202 and 204 that are operating in parallel so that the desired performance is the sum of the performance of the two pumps. Thus, several automatic rules are implemented. If cavitation is detected in one pump but not the other, the speed of the cavitating pump is diminished and the speed of the non-cavitating pump is increased so that a desired pumping performance is achieved but the cavitation in one of the pumps is stopped by decreasing its speed of operation. If cavitation is detected in both pumps above a predetermined threshold, the speed of both pumps is incrementally diminished until the cavitation in both pumps drop below the threshold. In this particular application, the desired performance is not critical to any other operation and therefore, the speed of the motors is allowed to decrease until the cavitation in each pump is diminished to a magnitude below the threshold. The issuance of the commands is indicated by block 336 and referring to FIG. 3, the commands are preferably issued by the central processor 270 directly to one or both of the motor controllers 234 and or 264. However, alternatively, commands could be issued-to the local processors 228 and 267 causing them to take control of the motor controllers and increase or decrease the speed of the motors 206 and 240 as desired. If no corrective action is required or after corrective action is taken, the program moves to block 338 and loops back to other operation. Likewise, when the alarm is issued as indicated at block 330 or if a decision is made to not issue a local alarm as indicated at block 328, the program in the local processors loop back to the beginning to block 302.

Figure 5:
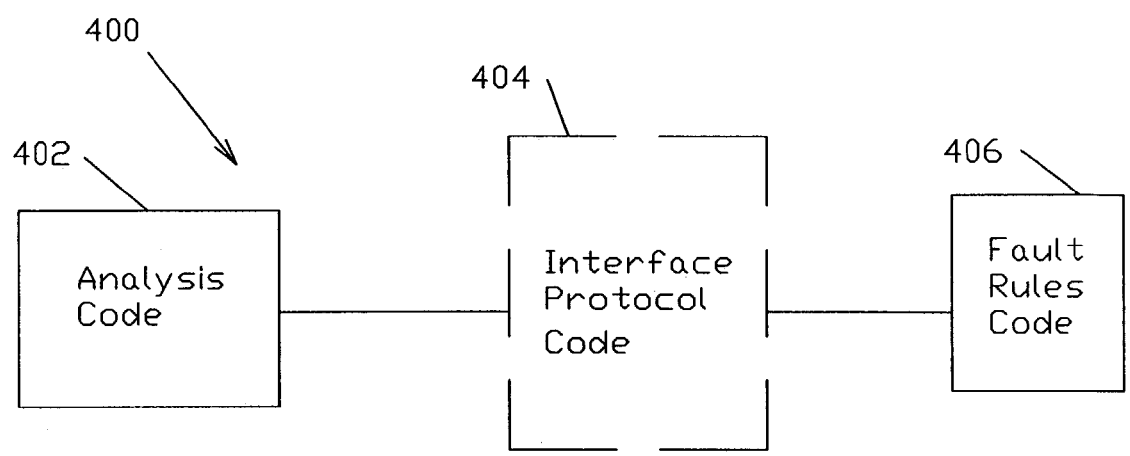
FIG. 5 is a schematic diagram illustrating the relationship between rules code and analysis code.

Referring now to FIG. 5, the structure of the program 400 residing in the local processors 228 and 267 is illustrated schematically. This schematic illustration is intended to illustrate a portion of the overall program residing in the local processors, but it will be understood that it is only a portion of the program, that portion which is particularly pertinent to the present invention.

The program 400 includes analysis code 402, an interface protocol code 404 and a rules code 406. The rules code 406 is shown as a separate block to indicate that code 406 is not embedded in any other portion of the program. Even though the interface protocol code 404 is shown as a separate block, it is shown in dashed lines to indicate that this portion of the program may be embedded in other programs, for example, it could be embedded in the analysis code 402. The analysis code actually performs logic operation based on signals produced by the sensors such as sensors 212–218 in FIG. 3. To perform the logic operation, the code 402 accesses the rules code 406 through the interface protocol code 404. When accessing the rules code 406, the analysis code 402 has determined the type of logic operation that will be performed, but the analysis code itself does not include information as to how that particular type of logic operation should be performed. The fault rules are organized in terms of the type of the logic operation to be performed so that when the analysis code 402 accesses the fault rules 406 for a particular type of logic operation, the appropriate fault rules are accessed and the appropriate information is transferred in the proper format in accordance with the interface protocol code 404. Thus, the analysis code performs the logic operation and detects faults based on the rules code 406.

The advantage of this structure is that the isolated rules code 406 may be changed by or for the user without completely reprogramming the local processor, such as processor 228. Thus, for a first particular plant, it may be known that a first particular set of fault rules is particularly effective and trustworthy in detecting faults in the plant. Thus, the first particular fault rules will be used for this plant. However, in a second plant, a second and different set of fault rules may be desired. In such case, for the second plant, the second set of fault rules may be programmed into the local processor 228 eliminating the first set of fault rules. This operation may be performed by the end user on the fly or it may be performed by a service provider as periodically requested by the end user. In either event, the separation of the fault rules and the analysis code provides for quick and easy access to and variability in the fault rules.

As mentioned above, the number and locations and types of measurements will vary depending upon each application. However, for most plant applications, the number and type of measurements that are needed can be generalized. Such information is provided in Table 1 below and the codes for interpreting the table are provided below the table.

TABLE 1

| Defect | #1s | MOH | MOV | MOA | MIH | MIV | MIA | PIH | PIV | PIA | POH | POV | POA | FLX | TS |
|---|---|---|---|---|---|---|---|---|---|---|---|---|---|---|---|
| Rolling Bearings | 6 | 1 | 2 | 2 | 1 | 2 | 1 | 1 | 2 | 1 | 1 | 2 | 2 | | Y |
| Misalignment/ Coupling | 6 | <u>1</u> | 2 | | <u>1</u> | 2 | <u>1</u> | <u>1</u> | 2 | <u>1</u> | <u>1</u> | 2 | | | Y |
| Motor Electrical | 2 | 1 | 2 | 2 | 1 | 2 | 2 | 2 | 2 | 2 | | | | 1 | |
| Pump Cavitation | 2 | | | 2 | | | | 1 | | | 1 | | | | Y |
| Imbalance | 6 | <u>1</u> | | | <u>1</u> | 2 | 1 | <u>1</u> | 2 | 2 | | | Y | | |
| All Defects | 6 | <u>1</u> | 2 | 2 | <u>1</u> | <u>2</u> | <u>1</u> | <u>1</u> | <u>2</u> | <u>1</u> | <u>1</u> | <u>2</u> | 2 | | Y |

Codes for Table 1
The number "1" indicates that a particular measurement is required;
"2" indicates that a particular measurement is optical;
"Y" indicates that turning speed is required for a defect detection; and
"underline" indicates that phase measurement is useful for defect confirmation.

The headings of the tables have the following meanings:
"#1s" indicates the number of vibration sensors required to detect the defect;
"P" is an abbreviation for pump points;
"M" is an abbreviation for motor points;
"O" is an abbreviation for outboard;
"I" is an abbreviation for inboard orientation;
"H" is an abbreviation for horizontal direction;
"V" is an abbreviation for vertical direction;
"A" is an abbreviation for axial direction;
"FLX" is an abbreviation for flux; and
"TS" is an abbreviation for turning speed.

To illustrate the interpretation of this table, consider the row identified as "rolling bearings." This row indicates that six primary sensors are required which are the motor outboard horizontal, motor inboard horizontal, motor inboard axial, pump inboard horizontal, pump inboard axial, pump outboard horizontal. The optional sensors are motor outboard vertical, motor outboard axial, motor inboard vertical, pump inboard vertical, pump outboard vertical and pump outboard axial. No flux sensor is required, but the turning speed is required. The remainder of the rows are interpreted in the same manner. While this table represents a generalization of what is required for a typical facility, it will be understood that different types of machinery may require different types of arrangements and sensors and analysis.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A fault detection system for detecting faults in a plurality of machines, the system comprising:
   a plurality of sensors for detecting parameters from the machines and producing parameter signals corresponding to the detected parameters;
   a plurality of local processors, each local processor associated with a subset of the machines and a corresponding subset of the sensors, each local processor receiving the parameter signals from the subset of sensors with which the local processor is associated, each local processor programmed with a plurality of inference rules that define a logic operation to be performed on one or more of the parameter signals to detect a fault in at least one of the machines with which the local processor is associated, and each local processor programmed to perform the logic operation on the one or more parameter signals as defined by the inference rules to detect faults in at least one of the machines with which the local processor is associated;
   a system processor in communication with the plurality of local processors; and
   each local processor programmed to transmit to the system processor fault information indicating at least whether a fault has been detected in at least one of the machines with which the local processor is associated, whereby the system processor may receive the fault information.

2. The system of claim 1 wherein at least a subset of the inference rules are selected from a group of rules consisting of:
   balance rules for determining a balance fault;
   alignment rules for determining an alignment of fault;
   bearing rules for determining a bearing fault;
   electrical rules for determining an electrical fault; and
   cavitation rules for determining a cavitation fault.

3. The system of claim 1 wherein one or more of the local processors are programmed with an analysis code for performing the logic operation and a rules code containing the inference rules, the rules code configured such that the inference rules may be changed without changing the analysis code.

4. The system of claim 1 wherein one or more of the local processors are programmed with inference rules that are customized for a particular one of the plurality of machines.

5. The fault detection system of claim 1 wherein the inference rules define on which of the parameter signals the logic operation is to be performed.

6. A fault detection system for detecting faults in a plurality of machines, the system comprising a plurality of local processors, each associated with one or more of the machines, each local processor receiving sensor information indicative of one or more operational characteristics of one or more of the machines, each local processor for performing a logic operation according to an analysis code to detect a fault in one or more of the machines based on the sensor information, the analysis code performing the logic operation to detect a fault according to inference rules contained in a rules code that is not embedded in the analysis code.

7. The fault detection system of claim 6 wherein each local processor has the analysis code and the rules code programmed therein as separate modules.

8. The fault detection system of claim 6 wherein the rules code is operable to be modified to change the inference rules without modification of the analysis code.

9. The fault detection system of claim 6 wherein the analysis code accesses the inference rules in the rules code according to a protocol provided by an interface protocol code.

10. A fault detection system for detecting faults in a plurality of machines, the system comprising:
one or more local processors, each associated with one or more of the machines, each local processor receiving sensor information indicative of one or more operational characteristics of one or more of the machines, each local processor for performing one or more logic operations to detect a fault in one or more of the machines based on the sensor information;
analysis code for execution in the one or more local processors to perform the one or more logic operations to detect a fault according to one or more inference rules; and
rules code including the one or more inference rules, the rules code accessible by the analysis code and reprogrammable independently of the analysis code.

11. The fault detection system of claim 10 wherein the rules code includes one or more inference rules selected from a group of inference rules comprising:
balance rules for determining a balance fault;
alignment rules for determining an alignment fault;
bearing rules for determining a bearing fault;
electrical rules for determining an electrical fault; and
cavitation rules for determining a cavitation fault.

12. The fault detection system of claim 10 farther comprising an interface protocol code for providing a protocol by which the analysis code accesses the inference rules in the rules code.

13. A fault detection system for detecting faults in a plurality of machines, the system comprising a plurality of local processors, each associated with one or more of the machines, each local processor receiving sensor information indicative of one or more operational characteristics of one or more of the machines, each local processor for performing a logic operation according to an analysis code to detect a fault in one or more of the machines based on the sensor information, the analysis code performing the logic operation according to inference rules contained in a rules code that is not embedded in the analysis code, wherein the analysis code accesses the inference rules in the rules code according to a protocol provided by an interface protocol code, and the interface protocol code is part of the analysis code.

14. A fault detection system for detecting faults in a plurality of machines, the system comprising:
one or more local processors, each associated with one or more of the machines, each local processor receiving sensor information indicative of one or more operational characteristics of one or more of the machines, each local processor for performing one or more logic operations to detect a fault in one or more of the machines based on the sensor information;
analysis code for execution in the one or more of the local processors to perform the one or more logic operations according to one or more inference rules;
rules code including the one or more inference rules, the rules code accessible by the analysis code and reprogrammable independently of the analysis code; and
an interface protocol code for providing a protocol by which the analysis code accesses the inference rules in the rules code, wherein the interface protocol code is part of the analysis code.

15. A fault detection system for detecting faults in a plurality of machines, the system comprising a plurality of local processors, each associated with one or more of the machines, each local processor for performing a logic operation according to an analysis code to detect a fault in one or more of the machines, the analysis code performing the logic operation to detect a fault according to inference rules contained in a rules code, the analysis code accessing the inference rules in the rules code according to an interface protocol code that establishes a protocol whereby the analysis code accesses the rules code, whereby the rules code may be changed to provide a new rules code that conforms to the interface protocol established by the interface protocol code.

16. The fault detection system of claim 15 wherein the rules code may be revised without changing either of the analysis code and the interface protocol code.

17. A fault detection system for detecting faults in a plurality of machines, the system comprising a plurality of local processors, each associated with one or more of the machines, each local processor for performing a logic operation according to an analysis code to detect a fault in one or more of the machines, the analysis code performing the logic operation to detect a fault according to inference rules contained in a rules code, the analysis code accessing the inference rules in the rules code according to an interface protocol code that establishes a protocol whereby the analysis code accesses the rules code, whereby the rules code may be changed to provide a new rules code that conforms to the interface protocol established by the interface protocol code, and wherein the interface protocol code is part of the analysis code.

18. A fault detection system for detecting faults in a plurality of machines, the system comprising a plurality of local processors, each associated with one or more of the machines, each local processor for performing a logic operation according to an analysis code to detect a fault in one or more of the machines, the analysis code performing the logic operation to detect a fault according to inference rules contained in a rules code, the analysis code accessing the inference rules in the rules code according to an interface protocol code that establishes a protocol whereby the analysis code accesses the rules code, wherein one or more of the local processors are programmed with inference rules that are customized for a particular one of the plurality of machines.

* * * * *